United States Patent
Koliatene et al.

(10) Patent No.: US 10,090,080 B2
(45) Date of Patent: Oct. 2, 2018

(54) ELECTRIC CABLE FOR THE POWER SUPPLY OF ELECTRICAL APPARATUS

(71) Applicant: SAFRAN ELECTRICAL & POWER, Blagnac (FR)

(72) Inventors: Flavien Koliatene, Miremont (FR); Michel Dunand, Balma (FR)

(73) Assignee: Safran Electrical & Power, Blagnac (FR)

( * ) Notice: Subject to any disclaimer, the term of this patent is extended or adjusted under 35 U.S.C. 154(b) by 0 days.

(21) Appl. No.: 15/557,295

(22) PCT Filed: Mar. 16, 2016

(86) PCT No.: PCT/FR2016/050586
§ 371 (c)(1),
(2) Date: Sep. 11, 2017

(87) PCT Pub. No.: WO2016/146946
PCT Pub. Date: Sep. 22, 2016

(65) Prior Publication Data
US 2018/0053583 A1    Feb. 22, 2018

(30) Foreign Application Priority Data
Mar. 17, 2015   (FR) .................... 15 52164

(51) Int. Cl.
*H01B 7/02*     (2006.01)
*H01B 7/00*     (2006.01)
(Continued)

(52) U.S. Cl.
CPC ......... *H01B 7/0225* (2013.01); *B32B 15/085* (2013.01); *H01B 3/306* (2013.01);
(Continued)

(58) Field of Classification Search
None
See application file for complete search history.

(56) References Cited

U.S. PATENT DOCUMENTS 3,616,177 A * 10/1971 Gumerman ............... C08J 7/047
  174/110 FC
4,851,282 A *  7/1989 Shimizu .............. B29C 67/0007
  428/375

(Continued)

FOREIGN PATENT DOCUMENTS

| EP | 1498909 A1 | 1/2005 |
| EP | 2557572 A1 | 2/2013 |
| FR | 2617325 A1 | 12/1988 |

OTHER PUBLICATIONS

International Search Report dated Jul. 8, 2016, in Application No. PCT/FR2016/050586 (2 pages).

*Primary Examiner* — Dimary Lopez Cruz
*Assistant Examiner* — Muhammed Azam
(74) *Attorney, Agent, or Firm* — Bookoff McAndrews, PLLC

(57) ABSTRACT

The invention relates to an electrical cable (200) intended to be used in a harness (1) to supply power to pieces of electrical equipment, comprising at least: a conductive core (210) comprising at least one conductive strand (211), and an insulating jacket (220) placed around the conductive core. The insulating jacket of the cable has a relative dielectric permittivity lower than or equal to 2 and comprises: a first layer (221) comprising a polymer aerogel, and a second layer (222), covering the first layer, comprising a fluoropolymer. The invention also relates to a harness comprising such an electrical cable.

10 Claims, 1 Drawing Sheet

(51) Int. Cl.
  *H01B 3/44* (2006.01)
  *B32B 15/085* (2006.01)
  *H01B 3/30* (2006.01)

(52) U.S. Cl.
  CPC ........... *H01B 3/445* (2013.01); *H01B 7/0009* (2013.01); *B32B 2307/206* (2013.01); *B32B 2457/00* (2013.01)

(56) References Cited

U.S. PATENT DOCUMENTS

| | | | |
|---|---|---|---|
| 5,414,215 A * | 5/1995 | Dunand | H01B 7/0009 174/109 |
| 6,420,262 B1 * | 7/2002 | Farrar | H01L 21/32051 257/E21.577 |
| 7,074,880 B2 | 7/2006 | Rhine et al. | |
| 7,991,257 B1 * | 8/2011 | Coleman | B29D 11/0073 264/1.24 |
| 2009/0233077 A1 * | 9/2009 | Advincula | C09D 5/006 428/304.4 |
| 2010/0144962 A1 * | 6/2010 | Jana | C08K 9/08 524/590 |
| 2011/0071231 A1 * | 3/2011 | Park | C08J 9/28 521/149 |
| 2011/0159375 A1 * | 6/2011 | Feaver | H01G 11/34 429/302 |
| 2011/0212516 A1 * | 9/2011 | Ness | B01F 3/0807 435/303.1 |
| 2014/0178579 A1 * | 6/2014 | Qi | G03G 15/2057 427/202 |
| 2014/0321894 A1 * | 10/2014 | Qi | G03G 15/206 399/333 |
| 2015/0259499 A1 * | 9/2015 | Attia | C08J 9/28 428/220 |
| 2016/0287265 A1 * | 10/2016 | Macdonald | A61B 90/08 |

* cited by examiner

ELECTRIC CABLE FOR THE POWER SUPPLY OF ELECTRICAL APPARATUS

CROSS-REFERENCE TO RELATED APPLICATIONS

This application is the U.S. national phase entry under 35 U.S.C. § 371 of International Application No. PCT/FR2016/050586, filed on Mar. 16, 2016, which claims priority to French Patent Application No. 1552164, filed on Mar. 17, 2015, the entireties of which are herein incorporated by reference.

BACKGROUND OF THE INVENTION

The present invention relates to the general field of the electrical cables used in the transmission of electrical power at high voltage and to the limitation of the appearance of partial discharges within these cables. The invention more particularly but not exclusively relates to the limitation of the appearance of partial discharges in the electrical harnesses and cables used in aircraft.

The advent of increasingly electrical airplanes has resulted in the increased use of pieces of electrical equipment that must be supplied with power and controlled, in environments that are sometimes hostile, by virtue of many electrical harnesses. An electrical harness is an assembly of electrical cables or wires of different gauges grouped into an electrical bundle, the cables or wires being run together and ending in connectors. In certain cases the harness may be shielded or placed in metal wireways in order to protect them from electromagnetic effects. Its reliability is indispensable for the availability of all of the devices of the electrical power system. The presence of insulators makes it possible to ensure the isolation of the various electric circuits when the cables are assembled into a harness. Considered together, all the solid and gaseous insulators that insulate the cables from each other and the conductive structures located in proximity to the harness are called the electrical insulation system (EIS).

The use of these pieces of electrical equipment induces the appearance of undesirable effects, in particular when the pieces of equipment are subjected to high electrical voltages (for example AC voltages of 230 VAC, DC voltages of +/−270 VDC, or even 540 VDC). These high voltages, associated with aeronautical environments in which pressure, temperature and moisture level may notably vary depending on the flight phases of the aircraft, lead to the appearance of partial discharges in the electrical insulation system of the cables of the harness.

Partial discharges are localized electrical discharges that may partially short-circuit the insulating interval separating two conductors of a harness. In practice, they manifest themselves in the form of electric micro-arcs in the gases located in proximity to (for example between two insulated cables) or in the interior of the insulator (for example in cavities) of the electrical cables. These discharges can lead to the slow and gradual degradation of the insulator of the electrical insulation system of the cables, and cause its premature rupture. The reliability and the availability of the electrical power chain may therefore be greatly impacted by these partial discharges.

The high voltages used increase the electric field in the gases of the EIS, thereby leading to the appearance of partial discharges. One known solution to this problem consists in increasing the distance between neighboring cables, this having the effect of decreasing this electric field. Another solution is to differently distribute the electric field between the insulator and the gases of the EIS, for example using cables having an insulating jacket of much larger thickness. Increasing this thickness allows the electric field in the insulating part of the EIS to be increased and the electric field in the gas between the cables to be decreased, this decreasing the appearance of partial discharges.

However, such a solution poses an integration problem because the weight of the harness and its general bulk are considerably increased. But the current tendency is on the contrary to decrease the weight and bulk of elements present in aircraft in order in particular to decrease its fuel consumption.

It would therefore be desirable to have at one's disposal compact and light harnesses and electrical cables that would make it possible to prevent the appearance of partial discharges.

OBJECTIVE AND SUMMARY OF THE INVENTION

The main purpose of the present invention is therefore to mitigate such drawbacks by providing an electrical cable intended to be used in a harness to supply power to pieces of electrical equipment, comprising at least a conductive core comprising at least one conductive strand, and an insulating jacket placed around the conductive core, characterized in that the insulating jacket has a relative dielectric permittivity lower than or equal to 2 and comprises a first layer comprising a polymer aerogel, and a second layer, covering the first layer, comprising a fluoropolymer.

Another solution for differently distributing the electric field between the insulator and the gases of the EIS, is to decrease the relative dielectric permittivity of the insulating jacket, this having the effect of increasing the field in the insulating part of the EIS and decreasing the electric field in the gas between the cables. The Inventors have thus determined, for an insulating-jacket thickness identical to the thicknesses of the insulating jackets of the cables conventionally used in low-voltage applications, that partial discharges are eliminated for voltages lower than 2 kilovolts peak when the relative dielectric permittivity of the material forming the insulating jacket is lower than or equal to 2 (for cables of an (AWG) gauge of 24 to 2). This value also takes into account possible variations in the environment of the cable, in particular a low pressure possibly combined with an increase in temperature, as may be the case in certain zones of the aircraft.

Furthermore, using a first layer made of polymer aerogel allows an insulator to be provided the permittivity of which is greatly decreased by the presence of nanoscopic pores containing gas (the relative dielectric permittivity of which is substantially equal to 1) and thus the size of this layer and therefore the weight of the cable can be decreased. The second layer made of fluoropolymer is external and for its part ensures chemical and thermal resistance (in particular to the fluids used in aircraft, for example: Skydrol, oil, kerosene, etc.) and resistance to arc tracking, it also participates in the elimination of partial discharges from the electrical insulation system. The use of such layers allows a cable diameter similar to that of the cables conventionally used in low-voltage applications to be preserved.

Preferably, the insulating jacket furthermore comprises a third layer, placed between the conductive core and the first layer, comprising a fluoropolymer. This arrangement is advantageous in particular in the case where the conductive core comprises a plurality of strands. Specifically, this third layer allows gaps that may remain between the conductive core and the electrical insulation system, places propitious to the appearance of partial discharges, to be filled.

Also preferably, the polymer aerogel is a polyimide aerogel.

Again preferably, the fluoropolymer may be chosen from: polytetrafluoroethylene (PTFE), perfluoroalkoxy alkane (PFA), ethylene tetrafluoroethylene (ETFE), and fluorinated ethylene propylene (FEP).

In order to further decrease the probability of appearance of partial discharges in the electrical insulation system and in particular in the first layer, the size of the gas-containing pores of the polymer aerogel is preferably smaller than or equal to 5 microns.

The second layer may be produced using a porous low-density material comprising pores having a size that is preferably smaller than or equal to 10 microns.

Preferably, a thickness of the insulating jacket is comprised between 0.15 mm and 0.50 mm.

In order to facilitate the production of the cable according to the invention, it is advantageous to provide a first layer consisting of a strip wound with a degree of overlap of at least 51%. Furthermore, a layer comprising a fluoropolymer preferably consists of a strip wound with a degree of overlap of at least 55%.

According to one example embodiment of the invention, the insulating jacket may comprise, a first layer comprising polyimide aerogel, a second layer comprising low-density polytetrafluoroethylene (PTFE), and a third layer comprising polytetrafluoroethylene (PTFE).

The invention also relates to an electrical harness comprising at least one electrical cable such as that described above.

BRIEF DESCRIPTION OF THE DRAWINGS

Other features and advantages of the present invention will become apparent from the description given below, with reference to the appended drawings, which illustrate example embodiments that are completely nonlimiting. In the figures.

DETAILED DESCRIPTION OF THE INVENTION

The present invention provides an electrical cable that may particularly, but not exclusively, be used to transmit power at high voltage between pieces of electronic or electrical equipment integrated into aircraft. As explained in detail below, the structure of the cable of the invention is noteworthy in that it allows the appearance of partial discharges within the electrical insulation system (EIS) of an electrical harness to be avoided in particular when it is used at high voltage.

Figure 1:
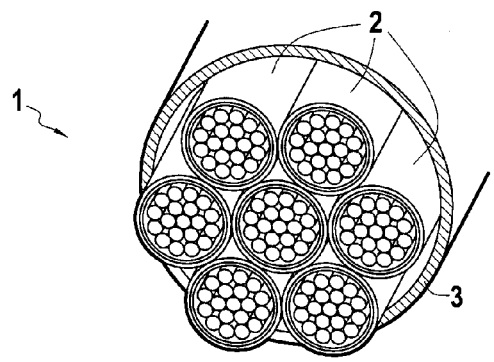
FIG. 1 is a schematic view of an electrical harness.

FIG. 1 shows an electrical harness 1 able to be used in an aircraft. Here it comprises seven electrical cables 2 forming a bundle encircled by a protective cladding 3. The electrical cables according to the invention are perfectly usable in such a harness 1, which is moreover one subject of the present invention.

Figure 2A:
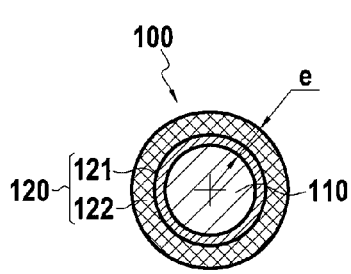
FIGS. 2A and 2B schematically show a single-strand electrical cable according to one embodiment of the invention.
Figure 2B:
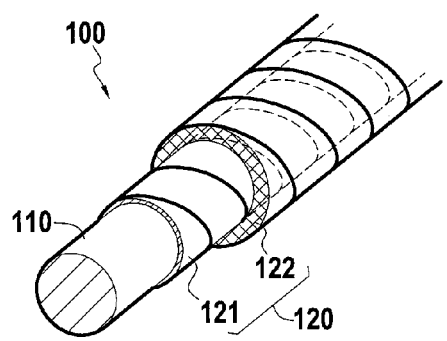

FIGS. 2A and 2B detail an electrical cable 100 according to one embodiment of the invention. The cable 100 comprises a conductive core 110 that here consists of a single conductive strand, and an insulating jacket 120 placed around the core 110. A conductive strand (or conductive wire) is for example made of copper, aluminum, a metal alloy, or any other electrically conductive material. The insulating jacket 120 is for its part made of insulating material.

In order to suppress the phenomenon of partial discharges in and around the insulating jacket 120 during use of the cable at high voltage (for voltages lower than 2 kilovolts at atmospheric pressure and room temperature in particular) and under the environmental conditions of an aircraft, the Inventors have determined that the relative dielectric permittivity of the insulating jacket must be lower than or equal to 2. This value results from the study of the voltage of appearance of partial discharges as a function of the relative dielectric permittivity of the material forming the insulating jacket of the cables in the case of a cable covered with a shielding braid, in which case it has been observed that the voltage of appearance of partial discharges is higher than 2 kilovolts peak when the relative dielectric permittivity of the material forming the insulating jacket of the cables is lower than or equal to 2.

To achieve such relative-dielectric-permittivity values while preserving a small thickness, the insulating jacket 120 firstly comprises a first layer 121 made of polymer aerogel, which covers the core 110 and makes direct contact therewith. This first layer, since it is aerated by nanoscopic pores (the relative dielectric permittivity of the air present in the pores being substantially equal to 1), allows the relative dielectric permittivity of the insulating jacket 120 to be decreased while decreasing its thickness, its weight and while avoiding the appearance of partial discharges. Furthermore, the size of the pores of the polymer aerogel is preferably smaller than 10 microns in order to again ensure a better protection against partial discharges within this first layer 121, which tend to appear in cavities of larger size.

The insulating jacket 120 moreover comprises a second layer 122 made of fluoropolymer, covering the first layer 121 made of polymer aerogel, which in particular ensures the chemical and thermal resistance and the resistance to arc tracking of the cable 100. By chemical resistance, what is meant is the resistance to contact with the fluids used on board the aircraft, such as, for example, Skydrol, oil or kerosene. This layer also participates in the elimination of the phenomenon of partial discharges.

The polymer aerogel of the first layer 121 may in particular be a polyimide aerogel, or any other type of aerated polymer. The second layer for its part may comprise a fluoropolymer for example chosen from the following: polytetrafluoroethylene (PTFE or Teflon™), perfluoroalkoxy alkane (PFA), ethylene tetrafluoroethylene (ETFE or Tefzel™), fluorinated ethylene propylene (FEP), etc.

The insulating jacket 120 will possibly be produced by winding strips around and all along the conductive core 110 for the first and second layers 121, 122, as illustrated in FIG. 2B.

By way of example, the first layer 121 may consist of a strip of polyimide aerogel of a thickness of 30 μm wound around the conductive core 110 with a degree of overlap of at least 51%. The second layer 122 may for its part consist of a strip of low-density polytetrafluoroethylene (PTFE) of a thickness of about 150 μm, wound around the first layer 121 with a degree of overlap of at least 55%. In this example, the relative dielectric permittivity of the insulating jacket 120 is about 1.98.

The degree of overlap corresponds to the proportion with which the strip overlaps itself after having made one turn about the conductive core 110, or of the first layer 121 where appropriate. Generally, the degree of overlap of a layer comprising a polymer aerogel is higher than 51%, and that of a layer comprising a fluoropolymer is higher than 55%.

Figure 3:
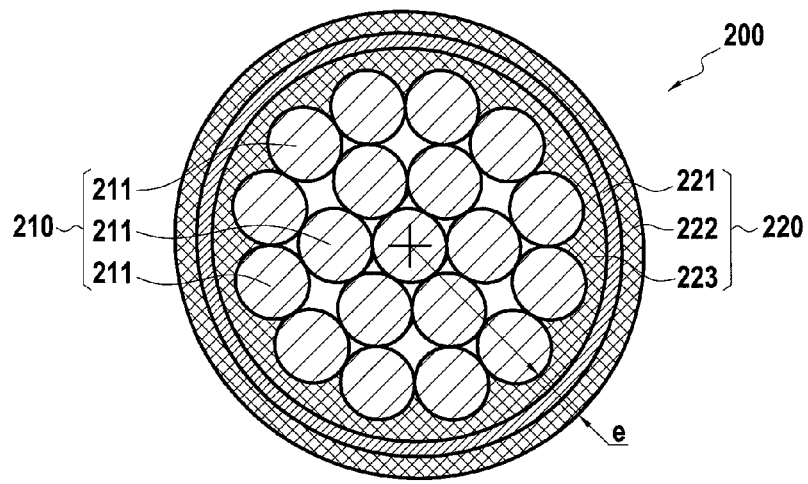
FIG. 3 is a schematic cross-sectional view of a multi-strand electrical cable according to another embodiment of the invention.

FIG. 3 shows a cable 200 according to another embodiment of the invention. The cable 200 comprises a conductive core 210 consisting of a multitude of conductive strands 211, as well as an insulating jacket 220 comprising three layers 221, 222 and 223.

The layers 221 and 222 respectively correspond to the first and second layers 121 and 122 of the single-strand cable 100 of FIGS. 2A and 2B, and respectively have the same characteristics.

In this embodiment, a third layer 223 is placed between the conductive core 210 and the first layer 221 made of polymer aerogel of the insulating jacket 220. This layer, which is preferably made of a fluoropolymer chosen from those presented above, allows gaps that may exist between the insulating jacket 220 and the conductive core 210 to be filled in order to prevent partial discharges from occurring therein.

In the same way as for the cable 100, the three layers 221, 222, 223 forming the insulating jacket 220 of the cable 200 may be produced from strips that are wound in succession about the conductive core 210 with, for the layer 221 made of polymer aerogel, a degree of overlap of at least 51%, and for the layers 222, 223 made of fluoropolymer, a degree of overlap of at least 55%.

By way of example, a multi-strand cable 200 according to the invention may have: a first layer 221 produced with a strip of polyimide aerogel of 30 μm thickness wound with a degree of overlap of at least 51%, a second layer 222 produced with a strip of low-density PTFE (for example having a density of about 2 g/cm$^3$) of a thickness of about 75 μm, and a third layer 223 produced with a strip of unsintered PTFE of a thickness of about 75 μm, the second and third layers being wound with a degree of overlap of at least 55%. In this example, the relative dielectric permittivity of the insulating jacket 220 is about 1.96.

Preferably, the insulating jackets 120, 220 of the cables 100, 200 according to the invention have a thickness e that is comprised between 0.15 mm and 0.25 mm, or even comprised between 0.15 and 0.50 mm. The thickness e being, in the case of the multi-strand cable 200, defined where the thickness of the insulating jacket 220 is smallest.

As indicated above, the relative dielectric permittivity of the insulating jacket must be lower than or equal to 2 in order to prevent the appearance of partial discharges when the cable is used at high voltage. The theoretical calculation and the measuring principle described below make it possible to verify whether a cable meets this requirement.

For the precedingly presented electrical cables according to the invention, the relative dielectric permittivity of the insulating jacket may be theoretically deduced from a calculation of the capacitance per unit length of the cable in cylindrical configuration (equivalent to a coaxial cable). Formula (A) below gives the capacitance per unit length C (expressed in F/m) of a coaxial cable as a function of the radius $r_1$ of its conductive core, of the outside radius $r_2$ of the insulating jacket, of the dielectric permittivity of free space $\varepsilon_0$, and of the relative dielectric permittivity $\varepsilon_r$ of the insulating jacket.

$$C = \frac{2\pi\varepsilon_0\varepsilon_r}{\ln\left(\frac{r_2}{r_1}\right)} \quad (A)$$

When the insulating jacket is multilayer, as is the case in the present invention, each layer i possesses a capacitance $C_i$. The equivalent capacitance $C_{eq}$ of the multilayer insulating jacket (which is equivalent to a set of capacitances $C_i$ placed in series) is given by formula (B) below.

$$\frac{1}{C_{eq}} = \sum_i \frac{1}{C_i} \quad (B)$$

Thus, since the capacitance $C_i$ of each layer forming the insulating material is known, it is possible, in the end, to calculate, by combining formulas (A) and (B), an estimation of the relative dielectric permittivity of the insulating jacket in order to verify that it is indeed lower than or equal to 2, according to the invention.

It is also possible to measure the relative dielectric permittivity of the insulating jacket experimentally by taking a sample of cable (for example of a length of 100 cm) equipped with the multilayer insulating jacket, and by placing around the cable a reference electrical ground possibly taking the form of a conductive cladding, which may be solid or liquid for example, in order to reproduce the configuration of a coaxial cable.

The conductive core and the reference electrical ground are connected to an impedance analyzer in order to perform the capacitance measurements in open circuit, typically in a frequency range of 100 Hz to 40 MHz. The measured values of capacitance (generally of about ten picofarads) thus allow, by calculation, using equation (A), an estimation of the relative dielectric permittivity $\varepsilon_r$ of the insulating jacket of the tested cable to be deduced.

It will be noted that in the present description the expressions "comprised between . . . and . . . " or "at least . . . " must be understood as including the limits.

The invention claimed is:

1. An electrical cable intended to be used in a harness to supply power to pieces of electrical equipment, comprising at least:
   a conductive core comprising at least one conductive strand, and
   an insulating jacket placed around the conductive core, wherein the insulating jacket has a relative dielectric permittivity lower than or equal to 2 and comprises:
   a first layer comprising a polymer aerogel, and
   a second layer, covering the first layer, comprising a fluoropolymer.

2. The cable as claimed in claim 1, wherein the insulating jacket furthermore comprises a third layer, placed between the conductive core and the first layer, comprising a fluoropolymer.

3. The cable as claimed in claim 1, wherein the polymer aerogel is a polyimide aerogel.

4. The cable as claimed in claim 1, wherein the fluoropolymer is chosen from: polytetrafluoroethylene, perfluoroalkoxy alkane, ethylene tetrafluoroethylene, and fluorinated ethylene propylene.

5. The cable as claimed in claim 1, wherein the pore size of the polymer aerogel is smaller than or equal to 10 microns.

6. The cable as claimed in claim 1, wherein a thickness of the insulating jacket is comprised between 0.15 mm and 0.50 mm.

7. The cable as claimed in claim 1, wherein the first layer consists of a strip wound with a degree of overlap of at least 51%.

8. The cable as claimed in claim 1, wherein the second layer comprising the fluoropolymer consists of a strip wound with a degree of overlap of at least 55%.

9. The cable as claimed in claim 2, wherein the insulating jacket comprises:
   the first layer comprising a polyimide aerogel,
   the second layer comprising low-density polytetrafluoroethylene, and
   the third layer comprising polytetrafluoroethylene.

10. An electrical harness comprising at least one electrical cable as claimed in claim 1.

* * * * *